US012777472B2

(12) United States Patent
Wei et al.

(10) Patent No.: US 12,777,472 B2
(45) Date of Patent: Oct. 27, 2026

(54) MULTIPLE CARRIER TRANSMISSION TECHNIQUES

(71) Applicant: ZTE Corporation, Shenzhen (CN)

(72) Inventors: Xingguang Wei, Shenzhen (CN); Jing Shi, Shenzhen (CN); Xianghui Han, Shenzhen (CN); Shuaihua Kou, Shenzhen (CN); Min Ren, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 325 days.

(21) Appl. No.: 18/505,512

(22) Filed: Nov. 9, 2023

(65) Prior Publication Data

US 2024/0080829 A1 Mar. 7, 2024

Related U.S. Application Data

(63) Continuation of application No. PCT/CN2022/074140, filed on Jan. 27, 2022.

(51) Int. Cl.
*H04W 72/0453* (2023.01)
*H04W 72/23* (2023.01)

(52) U.S. Cl.
CPC ....... *H04W 72/0453* (2013.01); *H04W 72/23* (2023.01)

(58) Field of Classification Search
CPC ............. H04W 72/0453; H04W 72/23; H04W 72/0457; H04W 72/1263; H04W 24/08; H04W 24/10; H04W 72/1273; H04L 5/001; H04L 5/0094; H04L 5/0092; H04L 5/0053
See application file for complete search history.

(56) References Cited

U.S. PATENT DOCUMENTS

| | | | | |
|---|---|---|---|---|
| 12,041,643 | B2 * | 7/2024 | Zhou | H04W 80/02 |
| 12,490,256 | B2 * | 12/2025 | Go | H04B 7/024 |
| 2016/0183263 | A1 | 6/2016 | Liu et al. | |

(Continued)

FOREIGN PATENT DOCUMENTS

| | | | |
|---|---|---|---|
| EP | 3831107 A1 | 6/2021 | |
| KR | 2020-0086290 A | 7/2020 | |

(Continued)

OTHER PUBLICATIONS

EPO, Extended European Search Report for European Patent Application No. 22922694.9, mailed on Sep. 23, 2024, 7 pages.

(Continued)

*Primary Examiner* — Brian T O Connor
(74) *Attorney, Agent, or Firm* — Perkins Coie

(57) ABSTRACT

Techniques are described to facilitate transmission by a communication device on multiple carriers. An example wireless communication method includes receiving, by a communication device, a first set of configurations for M active carriers or a second set of configurations for N bands, and an indication that identifies P carriers allowed for transmissions by the communication device, where each carrier from the M active carriers is located within one of the N bands, where the P carriers are from the M active carriers, where M and N are integers greater than 1, and where P is an integer greater than zero; and communicating, by the communication device, using one or more carriers from the P carriers.

16 Claims, 6 Drawing Sheets

(56) References Cited

U.S. PATENT DOCUMENTS

| | | | | |
|---|---|---|---|---|
| 2019/0253925 | A1 | 8/2019 | Gholmieh et al. | |
| 2020/0229175 | A1* | 7/2020 | Li | H04W 72/543 |
| 2020/0374880 | A1 | 11/2020 | Jung et al. | |
| 2022/0150744 | A1* | 5/2022 | Wang | H04L 5/0048 |
| 2025/0056513 | A1* | 2/2025 | Kang | H04L 1/08 |

FOREIGN PATENT DOCUMENTS

| | | | |
|---|---|---|---|
| KR | 2020-0118433 | A | 10/2020 |
| KR | 2022-0003526 | A | 1/2022 |
| WO | 2019062542 | A1 | 4/2019 |

OTHER PUBLICATIONS

IP Australia, First Examination Report for Australian Patent Application No. 2022437935, mailed on Oct. 2, 2024, 3 pages.
IP Australia, Notice of Acceptance for Australia Patent Application No. 2022437935, mailed on Nov. 14, 2024, 3 pages.
International Search Report for International Application No. PCT/CN2022/074140, Mail Date: Oct. 18, 2022. 10 pages.
"On wideband carrier and multiple carrier operation," Huawei, HiSilicon, 3GPP TSG RAN WG1 Meeting #88bis, Spokane, USA, Apr. 3-7, 2017, R1-1704195.
MOIP, Office Action for Korean Application No. 10-2024-7010082, mailed on Dec. 18, 2025, 8 pages with unofficial English translation.
Notice of Allowance from Korean Patent Application No. 10-2024-7010082 dated Jun. 22, 2026 with English summary, 9 pages.
First Examination Report from Indian Patent Application No. 202417016868 dated Jul. 16, 2026, 7 pages.

* cited by examiner

MULTIPLE CARRIER TRANSMISSION TECHNIQUES

CROSS REFERENCE TO RELATED APPLICATIONS

This patent document is a continuation of and claims benefit of priority to International Patent Application No. PCT/CN2022/074140, filed on Jan. 27, 2022. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for facilitating transmission on multiple carriers.

A first example wireless communication method includes receiving, by a communication device, a first set of configurations for M active carriers or a second set of configurations for N bands, and an indication that identifies P carriers allowed for transmissions by the communication device, where each carrier from the M active carriers is located within one of the N bands, where the P carriers are from the M active carriers, where M and N are integers greater than 1, and where P is an integer greater than zero; and communicating, by the communication device, using one or more carriers from the P carriers.

In some embodiments, the communication device receives an indication of Q bands that are allowed for transmissions by the communication device, wherein the Q bands are from the N bands. In some embodiments, the first set of configurations for the M active carriers includes a list of carrier combinations that includes a plurality of indexes and a plurality of combination of carriers, each index is associated with and identifies at least one carrier up to the P carriers, prior to the communicating, the communication device receives an index associated with the one or more carriers, and the communication device performs the communicating using the one or more carriers associated with the index. In some embodiments, the second set of configurations for the N bands includes a list of band combinations that includes a plurality of indexes and a plurality of combination of bands, each index is associated with and identifies at least one band up to Q bands, the Q bands are from the N bands, prior to the communicating, the communication device receives an index associated with one or more bands that includes the one or more carriers, and the communication device performs the communicating using the one or more carriers included in the one or more bands that is associated with the index.

In some embodiments, the M active carriers are M uplink carriers from the N bands, the P carriers are P uplink carriers, the first set of configurations for the M uplink carriers include a set of configurations for the P uplink carriers, the first set of configurations for the M uplink carriers includes a list of carrier combinations that includes a plurality of indexes and a plurality of combination of uplink carriers, each index is associated with and identifies at least one uplink carrier up to the P uplink carriers, the set of configurations for the P uplink carriers includes any one or more of the following: a frequency of each of the P uplink carriers, a switching period configuration during which the communication device is not required to transmit on the P carriers, a carrier configuration that indicates a number of transmit antennas associated with the one or more carriers, a mode of uplink transmission switching that indicates whether a switching period is needed when switching from a 1-port transmission on one carrier to a 1-port transmission on another carrier, and/or a power boosting configuration that indicates whether the communication device is enabled to boost power for transmission; and the communication device receives an index associated with the one or more carriers from the P uplink carriers In some embodiments, the first set of configurations includes a list of band combinations that includes a plurality of indexes and a plurality of combination of bands, each index is associated with and identifies at least one band up to Q bands, the Q bands are from the N bands, the communication device performs uplink switching from a first band of the Q bands to a second band of the Q bands. In some embodiments, the M active carriers are M downlink carriers from the N bands, the P carriers are P downlink carriers, the first set of configurations for the M downlink carriers include a set of configurations for the P downlink carriers, the first set of configurations for the M downlink carriers includes a list of carrier combinations that includes a plurality of indexes and a plurality of combination of downlink carriers, each index is associated with and identifies at least one downlink carrier up to the P downlink carriers, the set of configurations for the P downlink carriers includes any one or more of the following: a frequency of each of the P downlink carriers, a switching period configuration during which the communication device is not required to receive on the P carriers, and/or a mode of downlink transmission switching that indicates whether a switching period is needed when switching from a 1-port reception on one carrier to a 1-port reception on another carrier; and the communication device receives an index associated with the one or more carriers from the P downlink carriers In some embodiments, the communication device receives the index from a downlink control information (DCI) or a media access control control element (MAC CE). In some embodiments, the communication device operates in an initial state in response to receiving an indication to switch from a first configuration from the first set of configurations for the M active carriers to a second configuration from the first set of configurations for the M active carriers, the first configuration is associated with a first set of carriers or a first set of bands, and the second configuration is associated with a second set of carriers or a second set of bands, and, in the initial state, the communication device operates one antenna for each carrier of the second configuration or one antenna for each band of the second configuration, or in the initial state, the communication device operates two antennas for one carrier of the second configuration or two antennas for one band of the second configuration.

In some embodiments, the communication device receives one initial state for each configuration in the first set of configurations for the M active carriers or for each set of configuration in the second set of configurations for the N bands, and the one initial state is associated with: one antenna for each carrier or for each band, or two antennas for one carrier or for one band. In some embodiments, the M active carriers include M uplink carriers, the one antenna includes one transmit antenna, and the two antennas include two transmit antennas. In some embodiments, the M active carriers include M downlink carriers, the one antenna includes one receive antenna, and the two antennas include two receive antennas. In some embodiments, the M active carriers are M uplink carriers, the P carriers are one or more P uplink carriers, and the communicating includes a transmission performed by the communication device using the one or more carriers from the one or more P uplink carriers. In some embodiments, the M active carriers are M downlink carriers, the P carriers are one or more P downlink carriers, and the communicating includes a reception performed by the communication device using the one or more carriers from the one or more P downlink carriers.

In some embodiments, the communicating, by the communication device, using one or more carriers from the P carriers includes: transmitting a set of information on a first carrier from the P carriers; performing an uplink switching by the communication device by switching from the first carrier from the P carriers to a second carrier from the P carriers, the communication device switches to the second carrier after a switching period in between a first time when the communication device switches from the first carrier and a second time when the communication device switches to the second carrier, the communication device is not required to transmit during the switching period; and transmitting another set of information on the second carrier from the P carriers.

A second example wireless communication method includes transmitting, by a network device, a first set of configurations for M active carriers or a second set of configurations for N bands, and an indication that identifies P carriers allowed for transmissions by a communication device, where each carrier from the M active carriers is located within one of the N bands, where the P carriers are from the M active carriers, where M and N are integers greater than 1, and where P is an integer greater than zero; and communicating, by the network device, using one or more carriers from the P carriers.

In some embodiments, the network device transmits an indication of Q bands that are allowed for transmissions by the communication device, wherein the Q bands are from the N bands. In some embodiments, the first set of configurations for the M active carriers includes a list of carrier combinations that includes a plurality of indexes and a plurality of combination of carriers, each index is associated with and identifies at least one carrier up to the P carriers, prior to the communicating, the network device transmits an index associated with the one or more carriers, and the network device performs the communicating using the one or more carriers associated with the index. In some embodiments, the second set of configurations for the N bands includes a list of band combinations that includes a plurality of indexes and a plurality of combination of bands, each index is associated with and identifies at least one band up to Q bands, the Q bands are from the N bands, prior to the communicating, the network device transmits an index associated with one or more bands that includes the one or more carriers, and the network device performs the communicating using the one or more carriers included in the one or more bands that is associated with the index.

In some embodiments, the M active carriers are M uplink carriers from the N bands, the P carriers are P uplink carriers, the first set of configurations for the M uplink carriers include a set of configurations for the P uplink carriers, the first set of configurations for the M uplink carriers includes a list of carrier combinations that includes a plurality of indexes and a plurality of combination of uplink carriers, each index is associated with and identifies at least one uplink carrier up to the P uplink carriers, the set of configurations for the P uplink carriers includes any one or more of the following: a frequency of each of the P uplink carriers, a switching period configuration during which the communication device is not required to transmit on the P carriers, a carrier configuration that indicates a number of transmit antennas associated with the one or more carriers, a mode of uplink transmission switching that indicates whether a switching period is needed when switching from a 1-port transmission on one carrier to a 1-port transmission on another carrier, and/or a power boosting configuration that indicates whether the communication device is enabled to boost power for transmission; and the network device transmits an index associated with the one or more carriers from the P uplink carriers In some embodiments, the first set of configurations includes a list of band combinations that includes a plurality of indexes and a plurality of combination of bands, each index is associated with and identifies at least one band up to Q bands, the Q bands are from the N bands, the communication device performs uplink switching from a first band of the Q bands to a second band of the Q bands. In some embodiments, the M active carriers are M downlink carriers from the N bands, the P carriers are P downlink carriers, the first set of configurations for the M downlink carriers include a set of configurations for the P downlink carriers, the first set of configurations for the M downlink carriers includes a list of carrier combinations that includes a plurality of indexes and a plurality of combination of downlink carriers, each index is associated with and identifies at least one downlink carrier up to the P downlink carriers, the set of configurations for the P downlink carriers includes any one or more of the following: a frequency of each of the P downlink carriers, a switching period configuration during which the communication device is not required to receive on the P carriers, and/or a mode of downlink transmission switching that indicates whether a switching period is needed when switching from a 1-port reception on one carrier to a 1-port reception on another carrier; and the network device transmits an index associated with the one or more carriers from the P downlink carriers In some embodiments, the network device transmits the index in a downlink control information (DCI) or a media access control control element (MAC CE). In some embodiments, the network device transmits one initial state for each configuration in the first set of configurations for the M active carriers or for each set of configuration in the second set of configurations for the N bands, and the one initial state is associated with: one antenna for each carrier or for each band, or two antennas for one carrier or for one band. In some embodiments, the M active carriers include M uplink carriers, the one antenna includes one transmit antenna, and the two antennas include two transmit antennas. In some embodiments, the M active carriers include M downlink carriers, the one antenna includes one receive antenna, and the two antennas include two receive antennas. In some embodiments, the M active carriers are M uplink carriers, the P carriers are one or more P uplink carriers, and the communicating includes a reception performed by the network device using the one or more carriers from the one or more P uplink carriers. In some embodiments, the M active carriers are M downlink carriers, the P carriers are one or more P downlink carriers, and the communicating includes a transmission performed by the network device using the one or more carriers from the one or more P downlink carriers.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
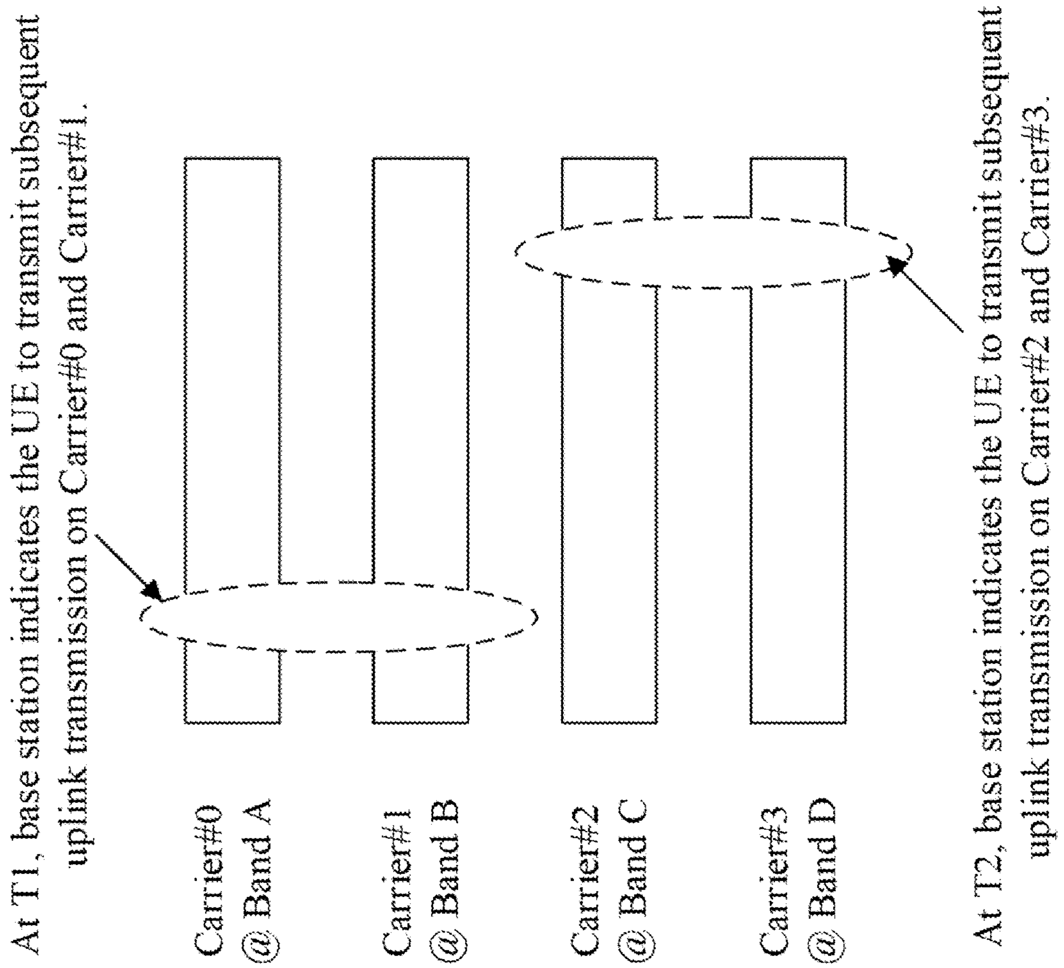
FIG. 1 shows an example scenario where a base station indicates to the UE uplink carriers to use from four uplink carriers from four bands.

In mobile communication networks, e.g., LTE (Long Term Evolution) and NR (New Radio), base station configures carriers for UE (User Terminal) based on UE's capabilities and the number of configured carriers for UE should not exceed UE's capabilities. As more and more spectrums are allocated or re-farmed for NR, it is common for one operator to own more than two frequency bands. Each frequency band can include a plurality of frequencies, and a frequency band can be referred to as a band. To efficiently utilize these frequency bands and support simultaneous transmission on these bands, more RF (Radio Frequency) chains (e.g., more than three) are required. This can increase the implementation complexity and cost for UE and base station. Thus, for at least these reasons, technical solutions are needed to efficiently utilize these frequency bands but without increasing the implementation complexity and cost.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Introduction

NR has introduced a scheme to support UL Tx (Transmission) antenna switching between two or three uplink carriers from two bands for UE with 2 Tx antennas, which is also known as uplink switching. Three cases have been defined:

Case #1: One Tx antenna is for the first band the another Tx antenna is for the second band;

Case #2: Two Tx antennas are for the first band and no Tx antenna is for the second band;

Case #3: No Tx antenna is for the first band and two Tx antennas are for the second band.

UE can switch between the above cases and different uplink transmissions can be supported in different cases. For example, in case #2, UE can support 1-port or 2-port uplink transmission on the first band but can't transmit any transmission on the second band since there is no Tx antenna for it.

II. Embodiment #1: General Concept

Base station configures and indicates M active uplink carriers from N bands to the UE, and the base station also indicates P uplink carriers from the M uplink carriers for the subsequent transmissions. M and N are integer numbers that are larger than 1. P is integer number that is larger than 0. M is equal to or larger than N. Unless receiving new indication from the base station, UE transmits subsequent uplink transmission on the P uplink carriers. Whether to transmit uplink transmission on one of the P uplink carriers or more than one uplink carriers depends on the scheduling command and RRC configuration. Once UE receives a new indication of uplink carriers for the subsequent transmissions, a switching period may be needed. UE is not required to transmit during the switching period. All the M uplink carriers are activated by the base station. The P uplink carriers for subsequent transmission may or may not include uplink carrier of PCell (Primary Cell). The P uplink carriers can be a subset of the M uplink carriers so that, if for example, P is greater than or equal to 2, a technical benefit of indicating M uplink carriers and P uplink carriers is that it can allow a UE to switch from one uplink carrier that may be associated with congestion/interference to another uplink carrier flexibly based on the base station configuration or scheduling command. Also, it can allow a UE to be equipped with hardware and software resource for simultaneous transmission on P carriers even though the UE is configured with M active uplink carriers and thus it helps to reduce the UE implementation cost if P is smaller than M.

In this patent document, the base station's indication of the M carriers, N bands, and/or P carriers from the M carriers can include the base station indicating to the UE a configuration (e.g., one or more carrier frequencies and/or one or more bands) associated with the M carriers, N bands, and/or P carriers, where the carriers can be uplink or downlink. The M carriers can be M active carriers instead of M deactivated carriers. In other words, the M carriers can be M carriers from the activated cells instead of deactivated cells.

In some embodiments, base station indicates Q bands for the subsequent transmissions to the UE, where Q bands is from the N bands mentioned above. Q is integer number that is larger than 0. UE transmits subsequent uplink transmission on the uplink carriers on these Q bands. The carriers in these N bands are activated by the base station. In other words, the carriers in these N bands are from activated cells instead of deactivated cells. The carriers in these Q bands for subsequent transmission may or may not include the carrier of PCell. The Q bands can be a subset of the N bands so that, if for example, Q is greater than or equal to 2, a technical benefit of indicating N bands and Q bands is that it can allow a UE to switch from one band that may be associated with congestion/interference to another band flexibly based on the base station configuration or scheduling command. Also, it can allow a UE to be equipped with hardware and software resource for simultaneous transmission on Q bands even though the UE is configured with N bands and thus it helps to reduce the UE implementation cost if Q is smaller than N.

In some embodiments, if the number of carriers configured for the UE is smaller, it is possible to indicate the carriers for subsequent transmission or indicate the bands for subsequent transmission. However, if the number of carriers configured for the UE is large, especially if multiple carriers are located in the same band, it is convenient to directly indicate the bands for subsequent transmission.

In some embodiments, the base station indicates P carriers or Q bands for subsequent transmission based on the channel condition of each carrier or band and the traffic load. For example, if the PCell has small bandwidth and the traffic load is high, then base station may indicate carriers other than the PCell for subsequent transmission. However, the traffic load is low and the channel condition of PCell is good, base station may indicate PCell for subsequent transmission.

One or more than one uplink carriers can be configured in each cell. If more than one uplink carriers are configured in one cell, the initial transmission and retransmission of PUSCH can be transmitted on different carriers in the same cell.

In the example scenario shown in FIG. 1, Carrier #0, Carrier #1, Carrier #2 and Carrier #3 are uplink carriers from Band A, Band B, Band C and Band D, respectively. At time T1, base station indicates to the UE to transmit subsequent uplink transmission on Carrier #0 and Carrier #1. Due to the change of channel condition or change of traffic load, base station indicates the UE to transmit subsequent uplink transmission on Carrier #2 and Carrier #3. If base station schedules one uplink on Carrier #2, UE will transmit this uplink transmission on Carrier #2. Alternatively, base station can indicate Band A and Band B to UE for subsequent transmissions at T1 and indicate Band C and Band D for subsequent transmissions at T2.

Figure 2:
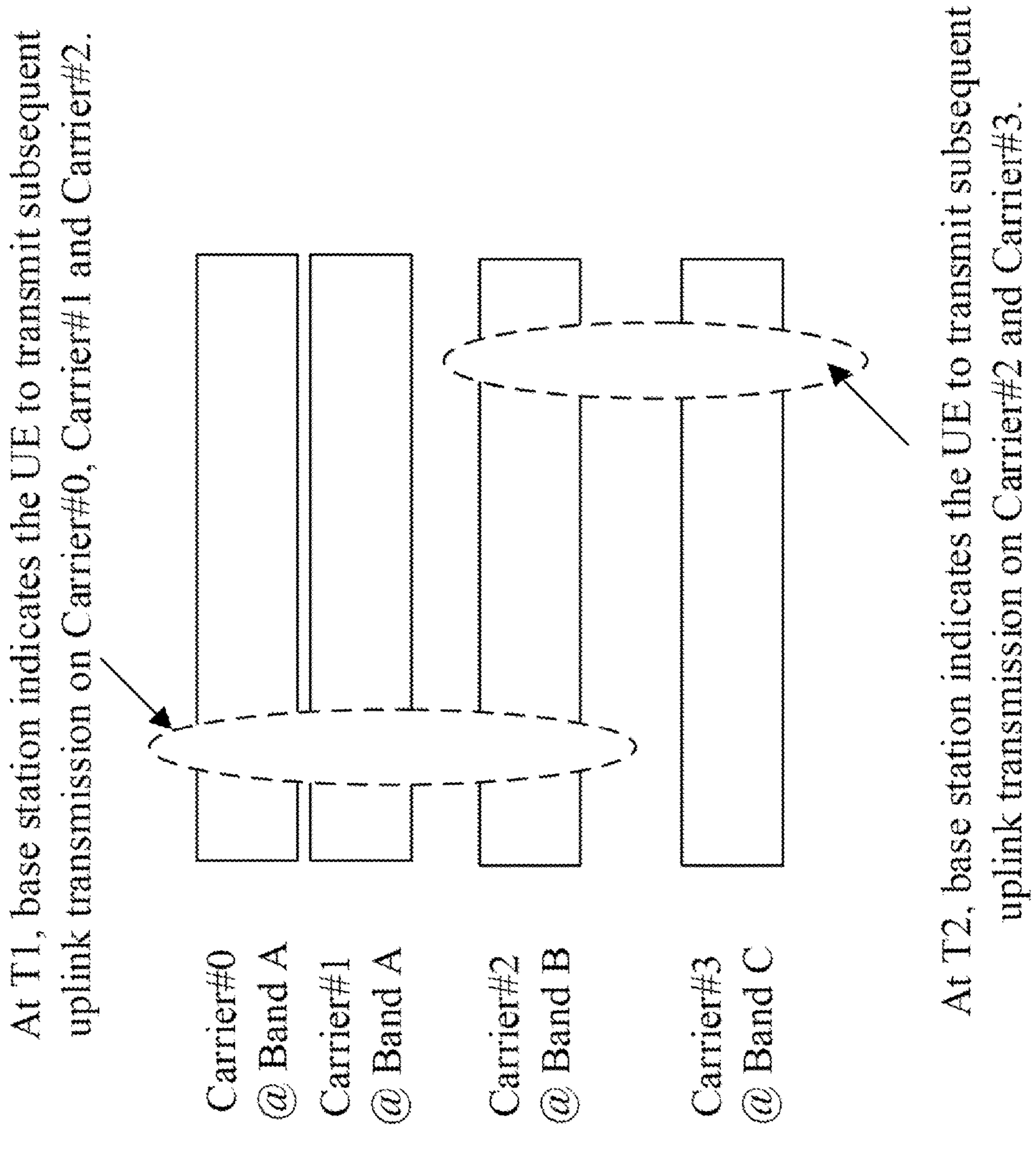
FIG. 2 shows an example scenario where a base station indicates to the UE uplink carriers to use from four uplink carriers from three bands.

In FIG. 2, both Carrier #0 and Carrier #1 are uplink carriers from Band A. They can be intra-band continuous or intra-band non-continuous CA (Carrier Aggregation). Carrier #2 and Carrier #3 are uplink carriers from Band B, and Band C, respectively. At time T1, base station indicates the UE to transmit subsequent uplink transmission on Carrier #0, Carrier #1 and Carrier #2. Due to the change of channel condition or change of traffic, base station indicates the UE to transmit subsequent uplink transmission on Carrier #2 and Carrier #3. Alternatively, base station can indicate Band A and Band B to UE for subsequent transmissions at T1 and indicate Band B and Band C for subsequent transmissions at T2.

Figure 3:
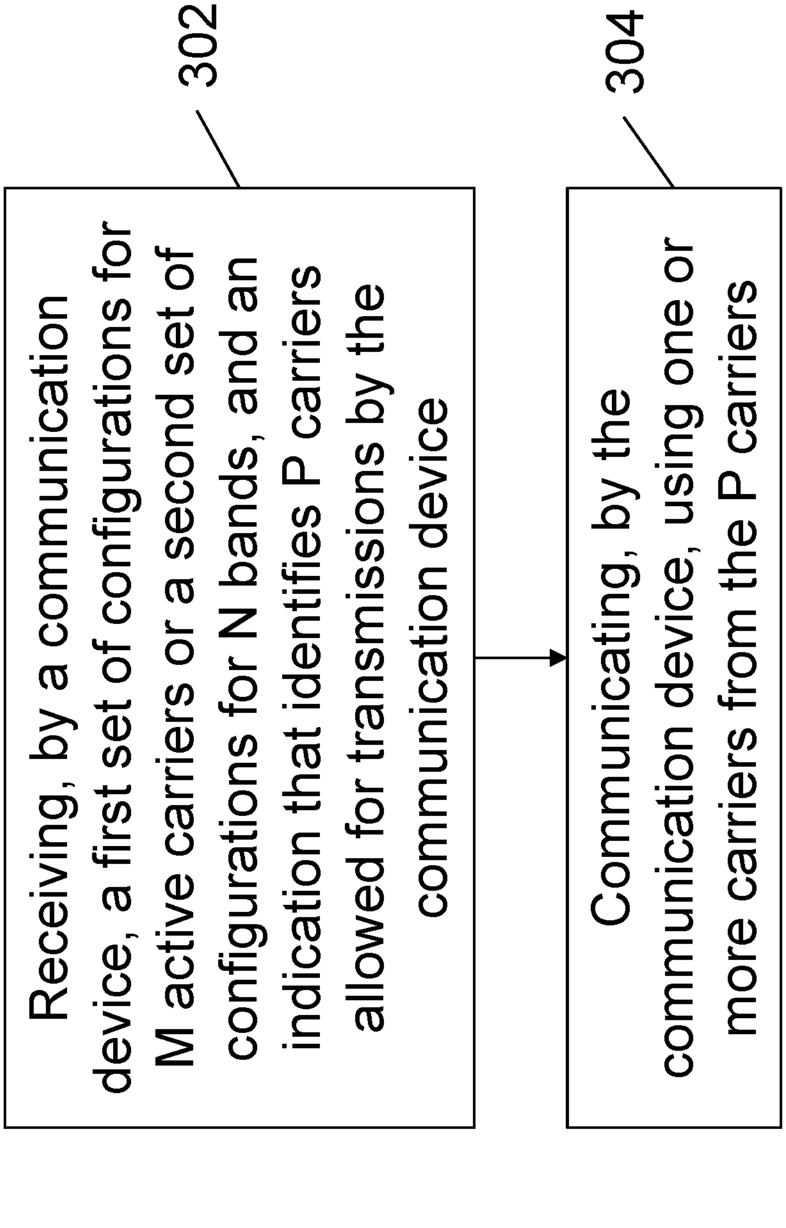
FIG. 3 shows an exemplary flowchart for facilitating communications between a communication device and a network device.

One of the technical benefits in the above two examples is that UE may only need to support 2 Tx antennas instead of 4 Tx antennas for FIGS. 1 and 3 Tx antennas for FIG. 2.

Base station configures M downlink carriers from N bands and indicates the M downlink carriers and the N bands to the UE, the base station can also indicate to the UE P downlink carriers for the subsequent reception for the UE. M and N are integer numbers that are larger than 1. P is integer number that is larger than 0. M is equal to or larger than N. Unless receiving new indication from the base station, UE receives subsequent downlink signal/channel on the P downlink carriers. All the M downlink carriers are activated by the base station. In other words, the M downlink carriers are from activated cells instead of deactivated cells. The P downlink carriers for subsequent reception may or may not include PCell.

In some embodiments, base station indicates Q bands for the subsequent reception for the UE. Q is integer number that is larger than 0. UE receives subsequent downlink signal/channel on the downlink carriers on these Q bands.

One or more than one downlink carriers can be configured in each cell. If more than one downlink carriers are configured in one cell, the initial transmission and retransmission of PDSCH can be transmitted on different carriers in the same cell.

The subsequent transmission for uplink includes at least PUSCH, PUCCH, SRS and PRACH.

The subsequent downlink signal/channel includes at least PDCCH, PDSCH, CSI-RS, PSS, SSS and PBCH.

III. Embodiment #2: RRC Configuration of Band/Carrier Pair

Base station configures M active uplink carriers from N bands to the UE and indicates a list of carrier combinations to the UE using, e.g., RRC signaling, where each carrier combination contains up to P uplink carriers. Base station indicates one of the carrier combinations to the UE for the subsequent transmissions. M and N are integer numbers that are larger than 1. P is integer number that is larger than 0. M is equal to or larger than N. Unless receiving new indication from the base station, UE transmits subsequent uplink transmission on the uplink carriers in the corresponding carrier combination.

In some embodiments, base station indicates a list of band combinations to the UE using, e.g., RRC signaling, where each band combination contains one or more than one band and each band combination contains up to Q bands for the subsequent transmissions, where Q bands can be less than or equal to a total number of bands (e.g., N bands) configured for the UE. Q is integer number that is larger than 0. UE transmits subsequent uplink transmission on the uplink carriers on these Q bands.

For example, in FIG. 1, base station configures and activated four uplink carriers for the UE, i.e., Carrier #0, Carrier #1, Carrier #2 and Carrier #3. Base station indicates the following carrier combination to the UE as shown in Table 1. Base station indicates carrier combination index 0 to the UE at T1. Thus, UE will transmit the subsequent uplink transmission on Carrier #0 or Carrier #1. At T2, base station indicates carrier combination index 3 to the UE. UE will transmit the subsequent uplink transmission on Carrier #2 or Carrier #3.

TABLE 1

| Combination index | Uplink carriers with each carrier combination |
|---|---|
| 0 | Carrier#0, Carrier#1 |
| 1 | Carrier#0, Carrier#2 |
| 2 | Carrier#1, Carrier#2 |
| 3 | Carrier#2, Carrier#3 |

For example, in FIG. 2, base station indicates the following band combinations to the UE. Base station indicates band combination index 0 to the UE at T1. Thus, UE will transmit the subsequent uplink transmission on Carrier #0, Carrier #1 or Carrier #2. At T2, base station indicates carrier combination index 2 to the UE. UE will transmit the subsequent uplink transmission on Carrier #2 or Carrier #3. Carrier #0 and Carrier #1 are from Band A. Carrier #2 and Carrier #3 are from Band B and Band C, respectively.

TABLE 2

| Combination index | Uplink carriers with each band combination |
|---|---|
| 0 | Band A, Band B |
| 1 | Band A, Band C |
| 2 | Band B, Band C |

Base station configures M active downlink carriers from N bands to the UE and indicates a list of carrier combinations to the UE using, e.g., RRC signaling, where each carrier combination contains up to P downlink carriers. Base station indicates one of the carrier combinations to the UE for the subsequent reception. M and N are integer numbers that are larger than 1. P is integer number that is larger than 0. M is equal to or larger than N. Unless receiving new indication from the base station, UE receives subsequent downlink signal/channel on the downlink carriers in the corresponding carrier combination.

In some embodiments, base station indicates a list of band combinations to the UE, where each band combination contains one or more than one band and each band combination contains up to Q bands for the subsequent reception for the UE. Q is integer number that is larger than 0. UE receives subsequent downlink signal/channel on the downlink carriers on these Q bands.

IV. Embodiment #3: RRC Configuration of Band/Carrier Pair with Other Information Base station configures M uplink carriers from N bands to the UE and indicates a list of carrier configurations to the UE using, e.g., RRC signaling, where each carrier configuration contains a carrier combination with a list of up to P uplink carriers and contains any one or more of the following information (that is further described below):

1) The switching period configuration;

2) The ‘carrier1’ and ‘carrier2’ configuration;

3) The mode of UL switching;

4) The power boosting configuration;

In some embodiments, each carrier configuration contains a band combination (e.g., as indicated in Table 2) with a list of up to P uplink carriers and contains any one or more of the information as mentioned above.

The switching period configuration indicates one carrier or one band to the UE, in which the switching period is configured. During the switching period, UE is not required to transmit on these P uplink carriers.

The ‘carrier1’ and ‘carrier2’ configuration indicates which carrier is ‘carrier1’ and which carrier is ‘carrier2’. Based on the configuration, the carrier configured with ‘carrier1’ is capable of one transmit antenna connector or two transmit antenna connectors and the carrier configured with ‘carrier2’ is capable of two transmit antenna connectors. For example, as defined in 3 GPP spec TS 38.101-1, base station configures ‘carrier1’ for the uplink carrier on Band A with 1 uplink carrier, and base station configures ‘carrier2’ for the uplink carriers on Band B with 2 uplink carriers.

The mode of UL switching refers to ‘switchedUL’ or ‘dualUL’. Base station indicates one of them for each carrier combination. For ‘switchedUL’, UE needs a switching period between 1-port uplink transmission on one carrier and another 1-port uplink transmission on another carrier. For ‘dualUL’, UE may not need any switching period between 1-port uplink transmission on one carrier and another 1-port uplink transmission on another carrier.

The power boosting configuration indicates whether UE can enable 3 dB boosting on the maximum output power for transmission on the carrier configured with carrier2.

UE transmits subsequent uplink transmission on the carriers indicated by the carrier combination in the carrier configuration and performs UL switching between these uplink carriers based on the other information indicated by the carrier configuration. With UL switching, UE’s Tx antenna(s) can be switched between uplink carriers. For example, if two carriers are indicated by the base station to the UE for subsequent transmission and UE has two Tx antennas, UE can put both Tx antennas on the first carrier, switch both Tx antennas to the second carrier or switch one Tx antenna to each carrier.

For example, in FIG. 1, base station indicates the following carrier configuration to the UE. Base station indicates 4 carrier configurations to the UE. Each carrier configuration contains two carriers and other information for the UL switching. Base station indicates carrier configuration index 0 to the UE at T1. UE will transmit the subsequent uplink transmission on Carrier #0 and Carrier #1. UE can perform UL switching between Carrier #0 and Carrier #1 with switching period in Carrier #0. The switching mode is ‘switchedUL’ and power boosting is enabled on Carrier #1.

TABLE 3

| Carrier configuration index | Uplink carriers with each carrier combination |
|---|---|
| 0 | Carrier combination: Carrier#0, Carrier#1<br>Switching period is configured in Carrier#0<br>Carrier#0 is configured as ‘carrier1’ and Carrier#1 is configured as ‘carrier2’<br>The switching mode is ‘switchedUL’<br>The power boosting is enabled. |
| 1 | Carrier combination: Carrier#0, Carrier#2<br>Switching period is configured in Carrier#0<br>Carrier#0 is configured as ‘carrier1’ and Carrier#2 is configured as ‘carrier2’<br>The switching mode is ‘switchedUL’<br>The power boosting is enabled. |
| 2 | Carrier combination: Carrier#1, Carrier#2<br>Switching period is configured in Carrier#1<br>Carrier#1 is configured as ‘carrier1’ and Carrier#2 is configured as ‘carrier2’<br>The switching mode is ‘switchedUL’<br>The power boosting is enabled. |
| 3 | Carrier combination: Carrier#2, Carrier#3<br>Switching period is configured in Carrier#2<br>Carrier#2 is configured as ‘carrier1’ and Carrier#3 is configured as ‘carrier2’ |

TABLE 3-continued

| Carrier configuration index | Uplink carriers with each carrier combination |
| --- | --- |
| | The switching mode is 'dualUL<br>The power boosting is not enabled. |

Base station configures M downlink carriers from N bands to the UE and indicates a list of carrier configurations to the UE using, e.g., RRC signaling, where each carrier configuration contains a carrier combination with a list of up to P downlink carriers and contains any one or more of the following information:

1) The switching period configuration;

2) The mode of DL Rx switching;

In some embodiments, each carrier configuration contains a band combination with a list of up to P downlink carriers and contains any one or more of the information as mentioned above.

The switching period configuration indicates one carrier or one band to the UE, in which the switching period is configured. The switching period configuration may also indicates the length of the switching period.

The mode of DL Rx switching indicates how many Rx antennas are allowed to be switched each time.

V. Embodiment #4: Indication Method

For embodiment #2, RRC configures a list of carrier combinations or band combinations. For embodiment #3, RRC configures a list of carrier configurations. The carrier combinations or band combinations in embodiment #2 and carrier configurations in embodiment #3 are referred as a set of carrier/band configurations in the embodiments described in this patent document.

In some embodiments, base station indicates one set of carrier/band configuration to the UE by DCI (Downlink Control Information) or MAC-CE (Media Access Control—Control Element).

In some embodiments, the DCI indicating the one set of carrier/band configuration is the DCI scheduling PUSCH or PDSCH. One field in the DCI indicates one set of the carrier/band configuration to the UE.

In some embodiments, when base station indicates a new set of carrier/band configuration to the UE by DCI or MAC-CE, UE keeps the current set of carrier/band configuration for a time duration and switches to the new set of carrier/band configuration after this time duration. This time duration is used for receiving other scheduling information from the base station or preparing for the switching. For example, the time duration can be a fixed time duration, e.g., 3 ms.

Take Table 3 as an example, a DCI field with two bits is used to indicate the carrier configuration. Bitmap '00', '01', '10' and '11' of this field are used to indicate carrier configuration index 0, carrier configuration index 1, carrier configuration index 2, and carrier configuration index 3, respectively.

In embodiment, one bitmap of this field is used to indicate UE to keep the current set of configuration without switching.

Take Table 2 as an example, bitmap '01', '10' and '11' of this field is used to indicate combination index 0, combination index 1 and combination index 2. Bitmap '00' is used to indicate that UE should keep the current set of configuration without switching.

VI. Embodiment #5: Initial State

In some embodiments, base station configures and indicates one initial state for uplink switching to the UE. UE switches to the initial state for uplink switching once UE is indicated to switch to another set of the carrier/band configuration.

In some embodiment, base station configures one initial state for the UE. UE switches to the initial state once the UE is indicated to switch to another set uplink carriers for subsequent transmission and the UE is to transmit a 1-port transmission on one of the uplink carriers from this set of uplink carriers.

In some embodiment, the initial state is configured by RRC signaling. For example, RRC configures one of the carrier combination index, band combination index or carrier configuration index as the initial state. In another embodiment, the initial state is indicated by MAC-CE. Unless receiving new command from base station, the initial state is kept.

In another embodiment, the initial state is indicated by DCI. Unless receiving new command from base station, the initial state is kept. For example, the initial state can be indicated by one field in the DCI format scheduling the PUSCH, or the DCI format indicating the set of carrier/band configuration.

In some embodiment, the initial state is defined without indication from base station. For example, the initial state is defined as one of the two states as defined below in this patent document.

In some embodiment, if UE is indicated to switch to another set of the carrier/band configuration and only one carrier or one band is configured in the set of carrier/band configuration, the initial state is two Tx antennas for this carrier or band.

The initial state can be one Tx antenna for each carrier or one Tx antenna for each band. In this state, UE is allowed to transmit 1-port uplink transmission on each uplink carrier indicated by the carrier configuration or band configuration.

The initial state can be two Tx antennas for one carrier or two Tx antennas for one band. In this state, UE is allowed to transmit 1-port or 2-port uplink transmission on the uplink carrier or the band indicated by the carrier configuration or band configuration.

In some embodiments, the initial state is two Tx antennas for one carrier or two Tx antennas for one band, on which the PUSCH scheduled by the DCI indicating a new set of carrier/band configuration is transmitted.

In some embodiments, base station indicates one initial state for each set of configuration configured for the UE.

Take Table 1 as an example, assuming that the UE is current in T1, base station sends a DCI to the UE. The DCI indicates combination index 3 to the UE and schedules 1-port PUSCH on Carrier #2. If the initial state is one Tx antenna for each carrier, then the UE is allowed to transmit 1-port uplink transmission on Carrier #2 and 1-port transmission on Carrier #3 unless performing further UL switching. If the initial state is two Tx antennas for one carrier, then the UE is allowed to transmit 1-port or 2-port uplink transmission on Carrier #2 unless performing further UL switching.

Take Table 3 as an example, base station indicates initial state for each set of carrier configuration.

In some embodiments, base station indicates one initial state for the UE. UE switches to the initial state once UE is indicated to switch to another set of the carrier/band configuration.

The initial state can be one or more Rx antenna for each carrier. The initial state can be one or more Rx antenna for each band. In this state, UE is allowed to receive 1-port downlink transmission on each downlink carrier indicated by the carrier configuration or band configuration.

The initial state can be two or more Rx antennas for one carrier or one band. In this state, UE is allowed to receive downlink transmission with more than one port on the downlink carrier or the band indicated by the carrier configuration or band configuration.

The initial state can be two or more Rx antennas for one carrier or one band, on which the PDSCH scheduled by the DCI indicating a new set of carrier/band configuration is transmitted.

In some embodiments, base station indicates one initial state for each set of configuration configured for the UE.

VII. Embodiment #6: How to Handle the Semi-Static Configuration

In some embodiments, once UE is indicated with a set of carrier/band configuration by the base station, UE is not allowed to transmit the semi-static uplink transmissions on carriers other than the carriers indicated by the set of configuration. The semi-static uplink transmission contains any one or more of the following:

1) PUCCH;
2) PRACH;
3) Periodic SRS;
4) PUCCH with SR;
5) CG-PUSCH;

Take Table 1 as an example, base station indicates combination index 0 to the UE. UE is not allowed to transmit CG-PUSCH on Carrier #2 or Carrier #3.

In another embodiment, a default set of carrier/band configuration is indicated to the UE. In some embodiments, the PCell is included in the default set of carrier/band configuration. If UE is indicated with a set of carrier/band configuration by the base station and there is semi-static uplink transmission on one carrier other than the carriers indicated by the set of carrier/band configuration, UE switches to the default set of carrier/band configuration to transmit the semi-static uplink transmission if the default set of carrier/band configuration includes the carrier.

Take Table 3 as an example, base station indicate carrier configuration index 0 as the default set of configuration. If base station indicates carrier configuration index 3 to the UE, UE will transmit the subsequent uplink transmission on Carrier #2 and Carrier #3. However, there is a PUCCH transmission on Carrier #0. UE switches to the default state, i.e., carrier configuration index 0, and transmits the PUCCH on Carrier #0.

In some embodiments, once UE is indicated with a set of carrier/band configuration by the base station, UE is not required to receive the semi-static downlink transmissions on carriers other than the carriers indicated by the set of configuration. The semi-static downlink transmission contains any one or more of the following:

1) SPS-PDSCH (Semi-Persistent Scheduling—PDSCH);
2) Periodic CSI-RS;
3) PDCCH;
4) PSS (Primary Synchronization Signal) and SSS (Secondary Synchronization Signal);
5) PBCH (Physical Broadcast Channel);

In another embodiment, a default set of carrier/band configuration is indicated to the UE. In some embodiments, the PCell is included in the default set of carrier/band configuration. If UE is indicated with a set of carrier/band configuration by the base station and there is semi-static downlink transmission on carrier other than the carriers indicated by the set of carrier/band configuration, UE switches to the default set of carrier/band configuration to receive the semi-static downlink transmission.

VIII. Embodiment #7: PCell Switching

In some embodiments, base station indicates one uplink carrier for PUCCH transmission for each set of carrier/band configuration configured for the UE.

In some embodiments, base station indicates one uplink carrier for PRACH transmission for each set of carrier/band configuration configured for the UE.

In some cases, the base station configures PUCCH and PRACH on the PCell. UE transmits PUCCH and PRACH on the carriers of PCell. However, if the PCell is not included in the indicated set of carrier/band configuration, requiring the UE to switch to PCell to transmit PUCCH and/or PRACH will end up with frequent switching. To avoid frequent switching, base station can indicate one uplink carrier for PUCCH and/or indicate one uplink carrier for PRACH from the carriers in each set of carrier/band configuration.

Take Table 3 as an example, base station indicates Carrier #0, Carrier #0, Carrier #1 and Carrier #2 are used for PUCCH and PRACH transmission for Carrier configuration index 0, Carrier configuration index 1, Carrier configuration index 2 and Carrier configuration index 3, respectively. Such that UE doesn't need to switch to PCell to transmit PUCCH or PRACH if the PCell is not indicated for subsequent transmission.

IX. Embodiment #8: Others

In some embodiments, each carrier combination or band combination has to include carriers of the PCell. In another embodiment, each carrier combination or band combination has to include a carrier with PUCCH configuration. So that UE can transmits PUCCH without switching the carrier/band configuration. Switching the carrier/band configuration may require switching period, reducing the switching can increase the system efficiency.

Currently, most of UEs are equipped with 2 Tx antennas. Typically, N is equal to 2 and M is equal to 2, 3, or 4.

FIG. 3 shows an exemplary flowchart for facilitating communications between a communication device and a network device. Operation 304 includes receiving, by a communication device, a first set of configurations for M active carriers or a second set of configurations for N bands, and an indication that identifies P carriers allowed for transmissions by the communication device, where each carrier from the M active carriers is located within one of the N bands, where the P carriers are from the M active carriers, where M and N are integers greater than 1, and where P is an integer greater than zero. Operation 304 includes communicating, by the communication device, using one or more carriers from the P carriers.

In some embodiments, the communication device receives an indication of Q bands that are allowed for transmissions by the communication device, wherein the Q bands are from the N bands. In some embodiments, the first set of configurations for the M active carriers includes a list of carrier combinations that includes a plurality of indexes and a plurality of combination of carriers, each index is associated with and identifies at least one carrier up to the P carriers, prior to the communicating, the communication device receives an index associated with the one or more carriers, and the communication device performs the communicating using the one or more carriers associated with the index. In some embodiments, the second set of configurations for the N bands includes a list of band combinations that includes a plurality of indexes and a plurality of combination of bands, each index is associated with and identifies at least one band up to Q bands, the Q bands are from the N bands, prior to the communicating, the communication device receives an index associated with one or more bands that includes the one or more carriers, and the communication device performs the communicating using the one or more carriers included in the one or more bands that is associated with the index.

In some embodiments, the M active carriers are M uplink carriers from the N bands, the P carriers are P uplink carriers, the first set of configurations for the M uplink carriers include a set of configurations for the P uplink carriers, the first set of configurations for the M uplink carriers includes a list of carrier combinations that includes a plurality of indexes and a plurality of combination of uplink carriers, each index is associated with and identifies at least one uplink carrier up to the P uplink carriers, the set of configurations for the P uplink carriers includes any one or more of the following: a frequency of each of the P uplink carriers, a switching period configuration during which the communication device is not required to transmit on the P carriers, a carrier configuration that indicates a number of transmit antennas associated with the one or more carriers, a mode of uplink transmission switching that indicates whether a switching period is needed when switching from a 1-port transmission on one carrier to a 1-port transmission on another carrier, and/or a power boosting configuration that indicates whether the communication device is enabled to boost power for transmission; and the communication device receives an index associated with the one or more carriers from the P uplink carriers In some embodiments, the first set of configurations includes a list of band combinations that includes a plurality of indexes and a plurality of combination of bands, each index is associated with and identifies at least one band up to Q bands, the Q bands are from the N bands, the communication device performs uplink switching from a first band of the Q bands to a second band of the Q bands. In some embodiments, the M active carriers are M downlink carriers from the N bands, the P carriers are P downlink carriers, the first set of configurations for the M downlink carriers include a set of configurations for the P downlink carriers, the first set of configurations for the M downlink carriers includes a list of carrier combinations that includes a plurality of indexes and a plurality of combination of downlink carriers, each index is associated with and identifies at least one downlink carrier up to the P downlink carriers, the set of configurations for the P downlink carriers includes any one or more of the following: a frequency of each of the P downlink carriers, a switching period configuration during which the communication device is not required to receive on the P carriers, and/or a mode of downlink transmission switching that indicates whether a switching period is needed when switching from a 1-port reception on one carrier to a 1-port reception on another carrier; and the communication device receives an index associated with the one or more carriers from the P downlink carriers In some embodiments, the communication device receives the index from a downlink control information (DCI) or a media access control control element (MAC CE). In some embodiments, the communication device operates in an initial state in response to receiving an indication to switch from a first configuration from the first set of configurations for the M active carriers to a second configuration from the first set of configurations for the M active carriers, the first configuration is associated with a first set of carriers or a first set of bands, and the second configuration is associated with a second set of carriers or a second set of bands, and, in the initial state, the communication device operates one antenna for each carrier of the second configuration or one antenna for each band of the second configuration, or in the initial state, the communication device operates two antennas for one carrier of the second configuration or two antennas for one band of the second configuration.

In some embodiments, the communication device receives one initial state for each configuration in the first set of configurations for the M active carriers or for each set of configuration in the second set of configurations for the N bands, and the one initial state is associated with: one antenna for each carrier or for each band, or two antennas for one carrier or for one band. In some embodiments, the M active carriers include M uplink carriers, the one antenna includes one transmit antenna, and the two antennas include two transmit antennas. In some embodiments, the M active carriers include M downlink carriers, the one antenna includes one receive antenna, and the two antennas include two receive antennas. In some embodiments, the M active carriers are M uplink carriers, the P carriers are one or more P uplink carriers, and the communicating includes a transmission performed by the communication device using the one or more carriers from the one or more P uplink carriers. In some embodiments, the M active carriers are M downlink carriers, the P carriers are one or more P downlink carriers, and the communicating includes a reception performed by the communication device using the one or more carriers from the one or more P downlink carriers.

In some embodiments, the communicating, by the communication device, using one or more carriers from the P carriers includes: transmitting a set of information on a first carrier from the P carriers; performing an uplink switching by the communication device by switching from the first carrier from the P carriers to a second carrier from the P carriers, the communication device switches to the second carrier after a switching period in between a first time when the communication device switches from the first carrier and a second time when the communication device switches to the second carrier, the communication device is not required to transmit during the switching period; and transmitting another set of information on the second carrier from the P carriers.

Figure 4:
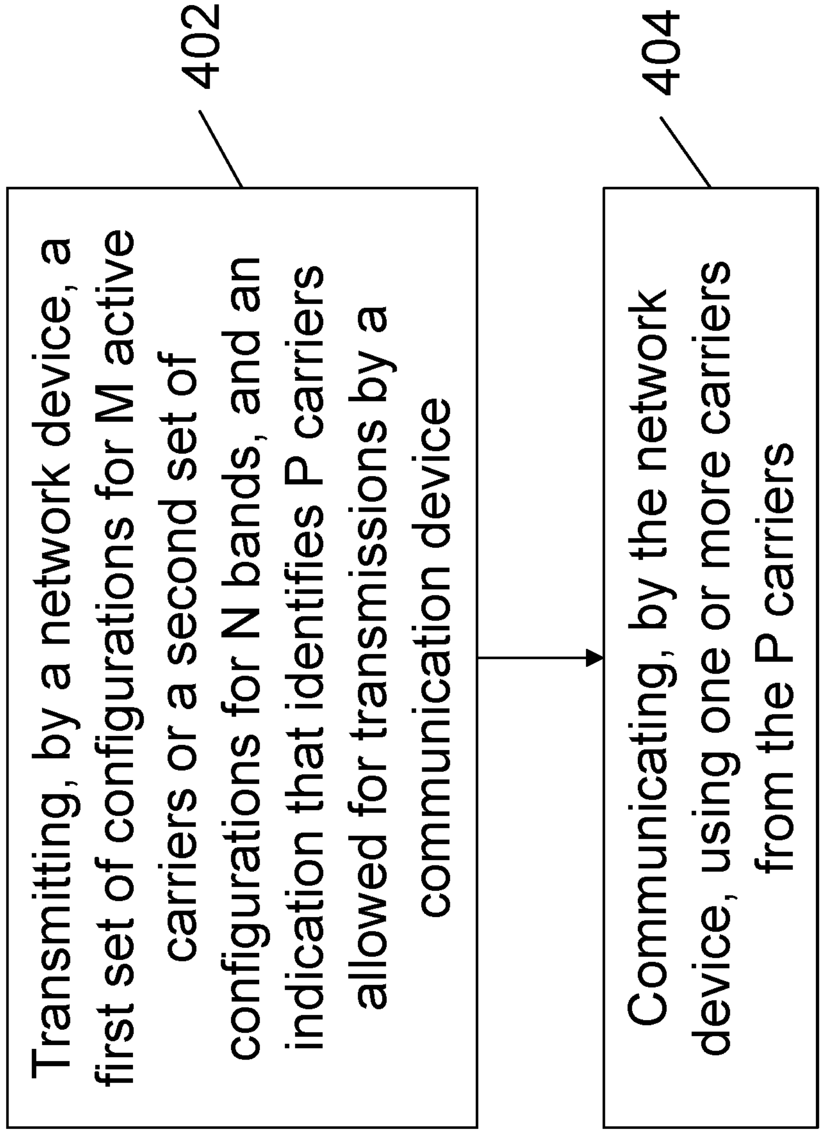
FIG. 4 shows an exemplary flowchart for facilitating communications between a network device and a communication device.

FIG. 4 shows an exemplary flowchart for facilitating communications between a network device and a communication device. Operation 402 includes transmitting, by a network device, a first set of configurations for M active carriers or a second set of configurations for N bands, and an indication that identifies P carriers allowed for transmissions by a communication device, where each carrier from the M active carriers is located within one of the N bands, where the P carriers are from the M active carriers, where M and N are integers greater than 1, and where P is an integer greater than zero. Operation 402 includes communicating, by the network device, using one or more carriers from the P carriers.

In some embodiments, the network device transmits an indication of Q bands that are allowed for transmissions by the communication device, wherein the Q bands are from the N bands. In some embodiments, the first set of configurations for the M active carriers includes a list of carrier combinations that includes a plurality of indexes and a plurality of combination of carriers, each index is associated with and identifies at least one carrier up to the P carriers, prior to the communicating, the network device transmits an index associated with the one or more carriers, and the network device performs the communicating using the one or more carriers associated with the index. In some embodiments, the second set of configurations for the N bands includes a list of band combinations that includes a plurality of indexes and a plurality of combination of bands, each index is associated with and identifies at least one band up to Q bands, the Q bands are from the N bands, prior to the communicating, the network device transmits an index associated with one or more bands that includes the one or more carriers, and the network device performs the communicating using the one or more carriers included in the one or more bands that is associated with the index.

In some embodiments, the M active carriers are M uplink carriers from the N bands, the P carriers are P uplink carriers, the first set of configurations for the M uplink carriers include a set of configurations for the P uplink carriers, the first set of configurations for the M uplink carriers includes a list of carrier combinations that includes a plurality of indexes and a plurality of combination of uplink carriers, each index is associated with and identifies at least one uplink carrier up to the P uplink carriers, the set of configurations for the P uplink carriers includes any one or more of the following: a frequency of each of the P uplink carriers, a switching period configuration during which the communication device is not required to transmit on the P carriers, a carrier configuration that indicates a number of transmit antennas associated with the one or more carriers, a mode of uplink transmission switching that indicates whether a switching period is needed when switching from a 1-port transmission on one carrier to a 1-port transmission on another carrier, and/or a power boosting configuration that indicates whether the communication device is enabled to boost power for transmission; and the network device transmits an index associated with the one or more carriers from the P uplink carriers In some embodiments, the first set of configurations includes a list of band combinations that includes a plurality of indexes and a plurality of combination of bands, each index is associated with and identifies at least one band up to Q bands, the Q bands are from the N bands, the communication device performs uplink switching from a first band of the Q bands to a second band of the Q bands. In some embodiments, the M active carriers are M downlink carriers from the N bands, the P carriers are P downlink carriers, the first set of configurations for the M downlink carriers include a set of configurations for the P downlink carriers, the first set of configurations for the M downlink carriers includes a list of carrier combinations that includes a plurality of indexes and a plurality of combination of downlink carriers, each index is associated with and identifies at least one downlink carrier up to the P downlink carriers, the set of configurations for the P downlink carriers includes any one or more of the following: a frequency of each of the P downlink carriers, a switching period configuration during which the communication device is not required to receive on the P carriers, and/or a mode of downlink transmission switching that indicates whether a switching period is needed when switching from a 1-port reception on one carrier to a 1-port reception on another carrier; and the network device transmits an index associated with the one or more carriers from the P downlink carriers In some embodiments, the network device transmits the index in a downlink control information (DCI) or a media access control control element (MAC CE). In some embodiments, the network device transmits one initial state for each configuration in the first set of configurations for the M active carriers or for each set of configuration in the second set of configurations for the N bands, and the one initial state is associated with: one antenna for each carrier or for each band, or two antennas for one carrier or for one band. In some embodiments, the M active carriers include M uplink carriers, the one antenna includes one transmit antenna, and the two antennas include two transmit antennas. In some embodiments, the M active carriers include M downlink carriers, the one antenna includes one receive antenna, and the two antennas include two receive antennas. In some embodiments, the M active carriers are M uplink carriers, the P carriers are one or more P uplink carriers, and the communicating includes a reception performed by the network device using the one or more carriers from the one or more P uplink carriers. In some embodiments, the M active carriers are M downlink carriers, the P carriers are one or more P downlink carriers, and the communicating includes a transmission performed by the network device using the one or more carriers from the one or more P downlink carriers.

Figure 5:
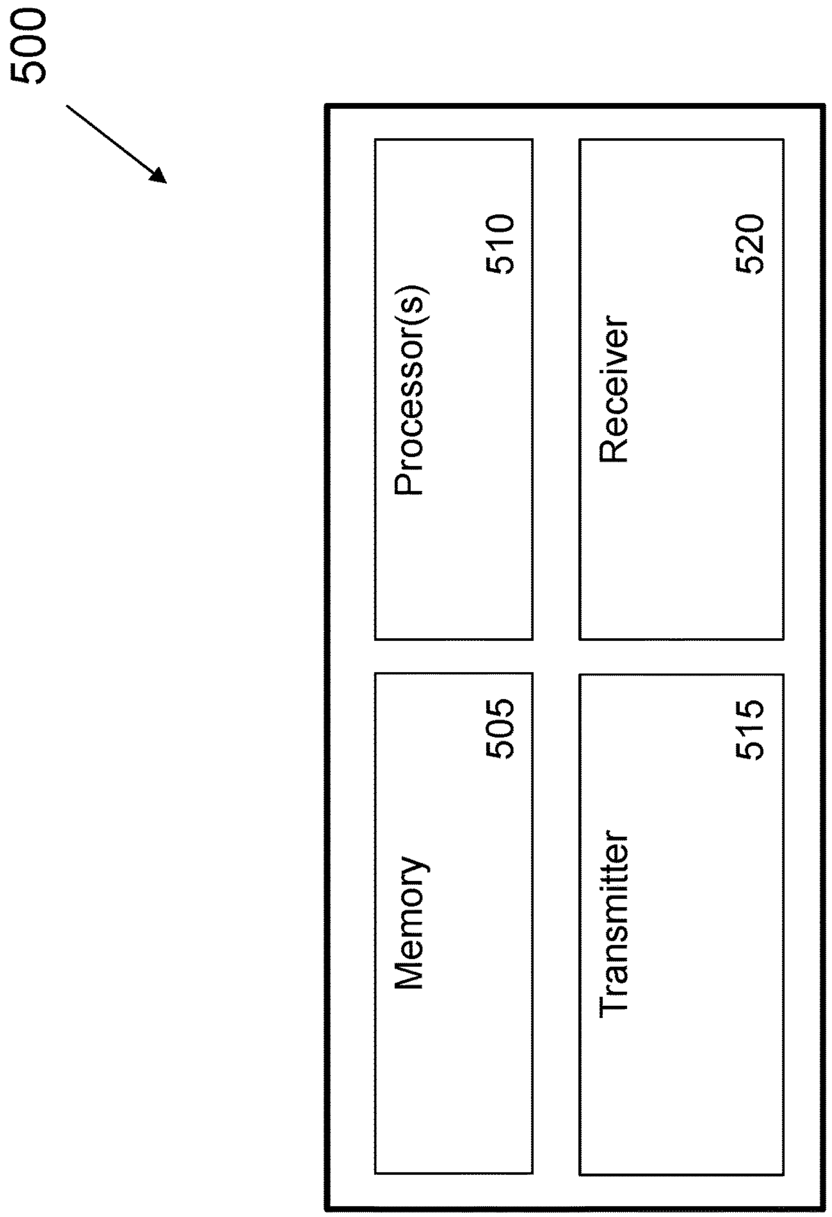
FIG. 5 shows an exemplary block diagram of a hardware platform that may be a part of a network device or a communication device.

FIG. 5 shows an exemplary block diagram of a hardware platform 500 that may be a part of a network device (e.g., base station) or a communication device (e.g., a user equipment (UE)). The hardware platform 500 includes at least one processor 510 and a memory 505 having instructions stored thereupon. The instructions upon execution by the processor 510 configure the hardware platform 500 to perform the operations described in FIGS. 1 to 4 and in the various embodiments described in this patent document. The transmitter 515 transmits or sends information or data to another device. For example, a network device transmitter can send a message to a user equipment. The receiver 520 receives information or data transmitted or sent by another device. For example, a user equipment can receive a message from a network device.

Figure 6:
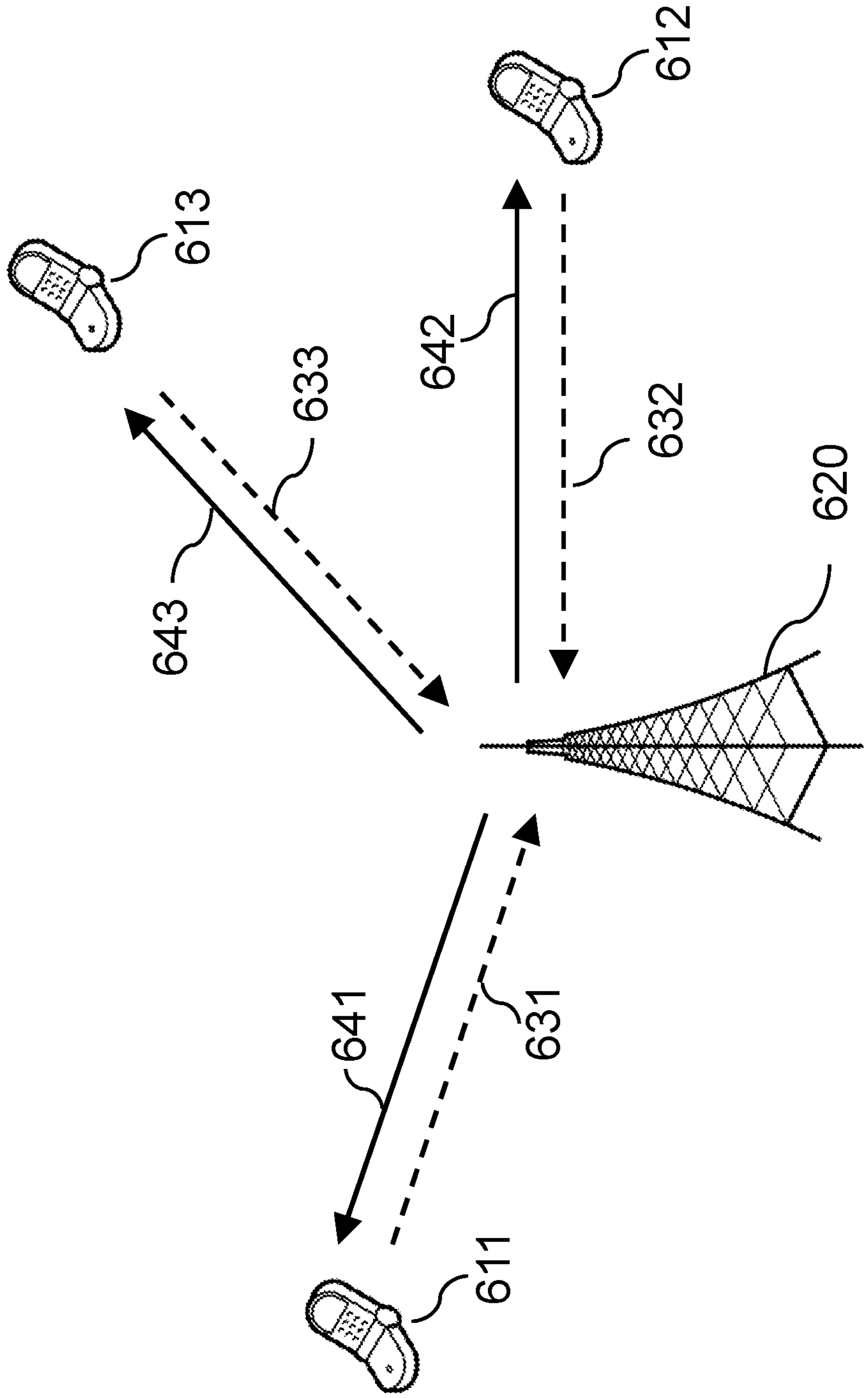
FIG. 6 shows an example of wireless communication including a base station (BS) and user equipment (UE) based on some implementations of the disclosed technology.

The implementations as discussed above will apply to a wireless communication. FIG. 6 shows an example of a wireless communication system (e.g., a 5G or NR cellular network) that includes a base station 620 and one or more user equipment (UE) 611, 612 and 613. In some embodiments, the UEs access the BS (e.g., the network) using a communication link to the network (sometimes called uplink direction, as depicted by dashed arrows 631, 632, 633), which then enables subsequent communication (e.g., shown in the direction from the network to the UEs, sometimes called downlink direction, shown by arrows 641, 642, 643) from the BS to the UEs. In some embodiments, the BS send information to the UEs (sometimes called downlink direction, as depicted by arrows 641, 642, 643), which then enables subsequent communication (e.g., shown in the direction from the UEs to the BS, sometimes called uplink direction, shown by dashed arrows 631, 632, 633) from the UEs to the BS. The UE may be, for example, a smartphone, a tablet, a mobile computer, a machine to machine (M2M) device, an Internet of Things (IoT) device, and so on.

In this document the term “exemplary” is used to mean “an example of” and, unless otherwise stated, does not imply an ideal or a preferred embodiment.

Some of the embodiments described herein are described in the general context of methods or processes, which may be implemented in some embodiments by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:

receiving, by a communication device, a first set of configurations for M active carriers, a second set of configurations for N bands, and an indication that identifies P carriers allowed for transmissions by the communication device, wherein each carrier from the M active carriers is located within one of the N bands, wherein the P carriers are from the M active carriers, wherein M and N are integers greater than 1, wherein P is an integer greater than zero, wherein the first set of configurations for the M active carriers includes a list of carrier combinations that includes a plurality of indexes and a plurality of combination of carriers, and wherein each index is associated with and identifies at least one carrier up to the P carriers; and communicating, by the communication device, using one or more carriers from the P carriers, wherein, prior to the communicating, the communication device receives an index associated with the one or more carriers, and wherein the communication device performs the communicating using the one or more carriers associated with the index.

2. The method of claim 1, wherein the second set of configurations for the N bands includes a list of band combinations that includes a plurality of indexes and a plurality of combination of bands, wherein each index is associated with and identifies at least one band up to Q bands, wherein the Q bands are from the N bands;

wherein, prior to the communicating, the communication device receives an index associated with one or more bands that includes the one or more carriers; and wherein the communication device performs the communicating using the one or more carriers included in the one or more bands that is associated with the index.

3. The method of claim 1, wherein the M active carriers are M uplink carriers from the N bands, wherein the P carriers are P uplink carriers, wherein the first set of configurations for the M uplink carriers include a set of configurations for the P uplink carriers, wherein the first set of configurations for the M uplink carriers includes a list of carrier combinations that includes a plurality of indexes and a plurality of combination of uplink carriers, wherein each index is associated with and identifies at least one uplink carrier up to the P uplink carriers, wherein the set of configurations for the P uplink carriers includes a frequency of each of the P uplink carriers; and wherein the communication device receives an index associated with the one or more carriers from the P uplink carriers.

4. The method of claim 1, wherein the M active carriers are M downlink carriers from the N bands, wherein the P carriers are P downlink carriers, wherein the first set of configurations for the M downlink carriers include a set of configurations for the P downlink carriers, wherein the first set of configurations for the M downlink carriers includes a list of carrier combinations that includes a plurality of indexes and a plurality of combination of downlink carriers, wherein each index is associated with and identifies at least one downlink carrier up to the P downlink carriers, wherein the set of configurations for the P downlink carriers includes a frequency of each of the P downlink carriers; and wherein the communication device receives an index associated with the one or more carriers from the P downlink carriers.

5. A wireless communication method, comprising:

transmitting, by a network device, a first set of configurations for M active carriers, a second set of configurations for N bands, and an indication that identifies P carriers allowed for transmissions by a communication device, wherein each carrier from the M active carriers is located within one of the N bands, wherein the P carriers are from the M active carriers, wherein M and N are integers greater than 1, wherein P is an integer greater than zero, wherein the first set of configurations for the M active carriers includes a list of carrier combinations that includes a plurality of indexes and a plurality of combination of carriers, and wherein each index is associated with and identifies at least one carrier up to the P carriers; and communicating, by the network device, using one or more carriers from the P carriers, wherein, prior to the communicating, the network device transmits an index associated with the one or more carriers, and wherein the network device performs the communicating using the one or more carriers associated with the index.

6. The method of claim 5, wherein the second set of configurations for the N bands includes a list of band combinations that includes a plurality of indexes and a plurality of combination of bands, wherein each index is associated with and identifies at least one band up to Q bands, wherein the Q bands are from the N bands;

wherein, prior to the communicating, the network device transmits an index associated with one or more bands that includes the one or more carriers; and wherein the network device performs the communicating using the one or more carriers included in the one or more bands that is associated with the index.

7. The method of claim 5, wherein the M active carriers are M uplink carriers from the N bands, wherein the P carriers are P uplink carriers, wherein the first set of configurations for the M uplink carriers include a set of configurations for the P uplink carriers, wherein the first set of configurations for the M uplink carriers includes a list of carrier combinations that includes a plurality of indexes and a plurality of combination of uplink carriers, wherein each index is associated with and identifies at least one uplink carrier up to the P uplink carriers, wherein the set of configurations for the P uplink carriers includes a frequency of each of the P uplink carriers; and wherein the network device transmits an index associated with the one or more carriers from the P uplink carriers.

8. The method of claim 5, wherein the M active carriers are M downlink carriers from the N bands, wherein the P carriers are P downlink carriers, wherein the first set of configurations for the M downlink carriers include a set of configurations for the P downlink carriers, wherein the first set of configurations for the M downlink carriers includes a list of carrier combinations that includes a plurality of indexes and a plurality of combination of downlink carriers, wherein each index is associated with and identifies at least one downlink carrier up to the P downlink carriers, wherein the set of configurations for the P downlink carriers includes a frequency of each of the P downlink carriers; and wherein the network device transmits an index associated with the one or more carriers from the P downlink carriers.

9. A communication device for wireless communication, comprising:

at least one processor configured to cause the communication device to:

receive a first set of configurations for M active carriers, a second set of configurations for N bands, and an indication that identifies P carriers allowed for transmissions by the communication device, wherein each carrier from the M active carriers is located within one of the N bands, wherein the P carriers are from the M active carriers, wherein M and N are integers greater than 1, wherein P is an integer greater than zero, wherein the first set of configurations for the M active carriers includes a list of carrier combinations that includes a plurality of indexes and a plurality of combination of carriers, and wherein each index is associated with and identifies at least one carrier up to the P carriers; and communicate using one or more carriers from the P carriers, wherein the first set of configurations for the M active carriers includes a list of carrier combinations that includes a plurality of indexes and a plurality of combination of carriers, and wherein each index is associated with and identifies at least one carrier up to the P carriers.

10. The communication device of claim 9, wherein the second set of configurations for the N bands includes a list of band combinations that includes a plurality of indexes and a plurality of combination of bands, wherein each index is associated with and identifies at least one band up to Q bands, wherein the Q bands are from the N bands;

wherein, prior to the communicating, the communication device receives an index associated with one or more bands that includes the one or more carriers; and wherein the communication device performs the communicating using the one or more carriers included in the one or more bands that is associated with the index.

11. The communication device of claim 9, wherein the M active carriers are M uplink carriers from the N bands, wherein the P carriers are P uplink carriers, wherein the first set of configurations for the M uplink carriers include a set of configurations for the P uplink carriers, wherein the first set of configurations for the M uplink carriers includes a list of carrier combinations that includes a plurality of indexes and a plurality of combination of uplink carriers, wherein each index is associated with and identifies at least one uplink carrier up to the P uplink carriers, wherein the set of configurations for the P uplink carriers includes a frequency of each of the P uplink carriers; and wherein the communication device receives an index associated with the one or more carriers from the P uplink carriers.

12. The communication device of claim 9, wherein the M active carriers are M downlink carriers from the N bands, wherein the P carriers are P downlink carriers, wherein the first set of configurations for the M downlink carriers include a set of configurations for the P downlink carriers, wherein the first set of configurations for the M downlink carriers includes a list of carrier combinations that includes a plurality of indexes and a plurality of combination of downlink carriers, wherein each index is associated with and identifies at least one downlink carrier up to the P downlink carriers, wherein the set of configurations for the P downlink carriers includes a frequency of each of the P downlink carriers; and wherein the communication device receives an index associated with the one or more carriers from the P downlink carriers.

13. A network device for wireless communication, comprising:

at least one processor configured to cause the network device to:

transmit a first set of configurations for M active carriers, a second set of configurations for N bands, and an indication that identifies P carriers allowed for transmissions by a communication device, wherein each carrier from the M active carriers is located within one of the N bands, wherein the P carriers are from the M active carriers, wherein M and N are integers greater than 1, wherein P is an integer greater than zero, wherein the first set of configurations for the M active carriers includes a list of carrier combinations that includes a plurality of indexes and a plurality of combination of carriers, and wherein each index is associated with and identifies at least one carrier up to the P carriers; and communicate using one or more carriers from the P carriers, wherein, prior to the communicating, the network device transmits an index associated with the one or more carriers, and wherein the network device performs the communicating using the one or more carriers associated with the index.

14. The network device of claim 13, wherein the second set of configurations for the N bands includes a list of band combinations that includes a plurality of indexes and a plurality of combination of bands, wherein each index is associated with and identifies at least one band up to Q bands, wherein the Q bands are from the N bands;

wherein, prior to the communicating, the network device transmits an index associated with one or more bands that includes the one or more carriers; and wherein the network device performs the communicating using the one or more carriers included in the one or more bands that is associated with the index.

15. The network device of claim 13, wherein the M active carriers are M uplink carriers from the N bands, wherein the P carriers are P uplink carriers, wherein the first set of configurations for the M uplink carriers include a set of configurations for the P uplink carriers, wherein the first set of configurations for the M uplink carriers includes a list of carrier combinations that includes a plurality of indexes and a plurality of combination of uplink carriers, wherein each index is associated with and identifies at least one uplink carrier up to the P uplink carriers, wherein the set of configurations for the P uplink carriers includes a frequency of each of the P uplink carriers; and wherein the network device transmits an index associated with the one or more carriers from the P uplink carriers.

16. The network device of claim 13, wherein the M active carriers are M downlink carriers from the N bands, wherein the P carriers are P downlink carriers, wherein the first set of configurations for the M downlink carriers include a set of configurations for the P downlink carriers, wherein the first set of configurations for the M downlink carriers includes a list of carrier combinations that includes a plurality of indexes and a plurality of combination of downlink carriers, wherein each index is associated with and identifies at least one downlink carrier up to the P downlink carriers, wherein the set of configurations for the P downlink carriers includes a frequency of each of the P downlink carriers; and wherein the network device transmits an index associated with the one or more carriers from the P downlink carriers.

* * * * *